United States Patent
Xiao et al.

(10) Patent No.: US 10,346,630 B2
(45) Date of Patent: Jul. 9, 2019

(54) METHOD OF MANAGING SEVERAL PROFILES IN A SECURE ELEMENT

(71) Applicant: GEMALTO SA, Meudon (FR)

(72) Inventors: Ying Xiao, Gemenos (FR); Jérome Duprez, Gemenos (FR); Franck Dehlinger, Gemenos (FR)

(73) Assignee: GEMALTO SA, Meduon (FR)

( * ) Notice: Subject to any disclaimer, the term of this patent is extended or adjusted under 35 U.S.C. 154(b) by 65 days.

(21) Appl. No.: 15/503,286

(22) PCT Filed: Jul. 3, 2015

(86) PCT No.: PCT/EP2015/065237
§ 371 (c)(1),
(2) Date: Feb. 10, 2017

(87) PCT Pub. No.: WO2016/023675
PCT Pub. Date: Feb. 18, 2016

(65) Prior Publication Data
US 2017/0228556 A1    Aug. 10, 2017

(30) Foreign Application Priority Data
Aug. 12, 2014    (CN) .......................... 2014 1 0393526

(51) Int. Cl.
*G06F 21/00*    (2013.01)
*G06F 21/62*    (2013.01)
(Continued)

(52) U.S. Cl.
CPC .......... *G06F 21/6218* (2013.01); *G06F 21/31* (2013.01); *G06F 21/78* (2013.01)

(58) Field of Classification Search
CPC ....... G06F 21/6218; G06F 21/31; G06F 21/78
See application file for complete search history.

(56) References Cited

U.S. PATENT DOCUMENTS

| | | | |
|---|---|---|---|
| 6,961,587 B1 * | 11/2005 | Vilppula | G06Q 20/341 455/410 |
| 2005/0033688 A1 * | 2/2005 | Peart | G06Q 20/04 705/39 |

(Continued)

FOREIGN PATENT DOCUMENTS

| | | |
|---|---|---|
| EP | 1 179 208 A2 | 2/2002 |
| EP | 1 179 208 B1 | 11/2004 |

(Continued)

OTHER PUBLICATIONS

International Search Report (PCT/ISA/210) dated Sep. 7, 2015, by the European Patent Office as the International Searching Authority for International Application No. PCT/EP2015/065237.

(Continued)

*Primary Examiner* — Ghodrat Jamshidi
(74) *Attorney, Agent, or Firm* — Buchanan Ingersoll & Rooney PC

(57) ABSTRACT

The invention is a method for managing profiles in a secure element that has several profiles comprising files organized in respective logical tree structures comprising respective root files. The root files have identifiers whose values are different from 0x3F00 and the method comprises the step of enabling browsing of the logical tree structure comprising a targeted root file in response to the receipt of a Select file command aiming at selecting said targeted root file.

9 Claims, 2 Drawing Sheets

(51) Int. Cl.
 *G06F 21/78* (2013.01)
 *G06F 21/31* (2013.01)

(56) References Cited

U.S. PATENT DOCUMENTS

| | | | | |
|---|---|---|---|---|
| 2011/0237297 | A1* | 9/2011 | Shin | H04W 76/10 455/558 |
| 2012/0058748 | A1* | 3/2012 | Jeung | H04W 88/06 455/414.1 |
| 2012/0083316 | A1* | 4/2012 | Lee | G06K 7/0021 455/558 |
| 2012/0149435 | A1* | 6/2012 | Jang | H04M 1/72563 455/558 |
| 2012/0159148 | A1* | 6/2012 | Behren | G06Q 20/3552 713/150 |
| 2013/0179626 | A1* | 7/2013 | Chang | G06F 12/0246 711/103 |
| 2014/0011478 | A1* | 1/2014 | Collins | H04L 43/00 455/411 |
| 2014/0308991 | A1 | 10/2014 | Lee et al. | |
| 2015/0110028 | A1* | 4/2015 | Wu | H04W 76/10 370/329 |
| 2015/0186621 | A1* | 7/2015 | Uy | G06F 21/10 726/26 |

FOREIGN PATENT DOCUMENTS

| | | |
|---|---|---|
| KR | 10-2013-0049730 A | 5/2013 |
| WO | WO 00/69183 | 11/2000 |

OTHER PUBLICATIONS

Written Opinion (PCT/ISA/237) dated Sep. 7, 2015, by the European Patent Office as the International Searching Authority for International Application No. PCT/EP2015/065237.
"ISO/IEC 7816-4", International Standard (Jan. 2005). (99 pages).
English translation of the Office Action (Notice of Preliminary Rejection) dated Sep. 20, 2018, by the Korean Patent Office in corresponding Korean Patent Application No. 10-2017-7003682. (5 pages).

* cited by examiner

US 10,346,630 B2

METHOD OF MANAGING SEVERAL PROFILES IN A SECURE ELEMENT

FIELD OF THE INVENTION

The present invention relates to methods of managing several profiles in a secure element. It relates particularly to methods of managing several profiles in a secure element wherein at least one profile is active.

BACKGROUND OF THE INVENTION

A secure element is either a tamper-resistant physical component able to store data and to provide services in a secure manner or a software component providing a trusted storage area and trusted services. In general, a secure element has a limited amount of memory, a processor with limited capabilities and is devoid of battery. For instance a UICC (Universal Integrated Circuit Card) is a secure element which embeds SIM applications for telecommunication purposes. A secure element can be installed, fixedly or not, in a terminal, like a mobile phone for example. In some cases, the terminals are constituted by machines that communicate with other machines for M2M (Machine to Machine) applications.

A secure element can be in the format of a smart card, or may be in any other format such as for example but not limited to a packaged chip as described in PCT/SE2008/050380, or any other format. A UICC can be used in mobile terminals in GSM, CDMA or UMTS networks for instance. The UICC ensures network authentication, integrity and security of all kinds of personal data.

It is known to solder or weld the secure element in a host device, in order to get it dependent of this host device. This is done in M2M (Machine to Machine) applications. The same objective is reached when a chip (a secure element) containing a Payment application, SIM or USIM applications and files is contained in the host device. The chip is for example soldered to the mother-board of the host device or machine and constitutes an embedded-secure element (eSE).

A secure element may contain a profile which can include a set of applications, a set of personal data and a set of secret data. Data related to a profile are stored via a logical tree structure. Such a logical tree structure comprises a root file and one or several directories and files.

The profile could be linked to a subscription. It may contain network access applications (NAA), payment applications or third party applications providing security for a specific service (e.g. NFC applications).

A physical secure element can emulate several virtual secure elements, each one represented as one profile. In such a case, these profiles are called logical profiles or virtual profiles. An emulated profile is hereinafter called profile. Usually each profile is a software based profile.

The invention concerns a way to manage several profiles which are run in a single secure element.

In the state of the art, only the logical tree structure of the active profile can be browsed at a given time.

There is a need to allow access to the logical tree structure of a profile different from the active profile.

SUMMARY OF THE INVENTION

An object of the invention is to solve the above mentioned technical problem.

The object of the present invention is a secure element including first and second profiles comprising files organized in respective logical tree structures comprising respective root files. These root files have identifiers whose values are different from 0x3F00. The secure element is configured to enable browsing of the logical tree structure comprising a targeted root file in response to the receipt of a Select file command aiming at selecting the targeted root file.

Advantageously, the secure element may be configured to select the root file of the profile currently activated in response to the receipt of a Select file command aiming at selecting a file having an identifier whose value is equal to 0x3F00.

Advantageously, the secure element may include a non volatile memory which contains a flag containing the identifier of the root file of the profile currently activated and the secure element may include a selecting module adapted to select the root file of the profile currently activated by using the flag when receiving a Select file command aiming at selecting a file having an identifier whose value is equal to 0x3F00.

Another object of the invention is a method for managing profiles in a secure element including first and second profiles that comprise files organized in respective logical tree structures comprising respective root files. The root files have identifiers whose values are different from 0x3F00 and the method comprises the step of enabling browsing of the logical tree structure comprising a targeted root file in response to the receipt of a Select file command aiming at selecting said targeted root file.

Advantageously, the method may comprise the step of selecting the root file of the profile currently activated in response to the receipt of a Select file command aiming at selecting a file having an identifier whose value is equal to 0x3F00.

Another object of the invention is a host device comprising a secure element according to the invention wherein the secure element is a UICC or an embedded-UICC (eUICC).

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure element intended to contain several profiles. The secure element may be coupled to any type of host device able to establish a communication session with the secure element. For example the host device may be a mobile phone, tablet PC, a vehicle, a meter, a slot machine, a TV or a computer.

In this specification, the notation "0x" refers to a number expressed in hexadecimal. For instance, 0x1234 is equal to 4660 in decimal.

In this specification, the select file command refers to the SELECT FILE command allowing selecting a file as defined in the ISO/IEC 7816-4 standard, the GSM 11.11 v8.3.0 or ETSI TS 102221 v11.0.0. This command allows selecting either a root file or a directory or a file. As defined by the ISO/IEC 7816-4 standard, the value 0x3F00 is reserved for the root file (also called master file).

A logical tree structure is a set of directories and files which are structured as a tree. In this specification, a logical tree structure is a hierarchical tree structure which can be considered as an autonomous file system.

According to the invention, a root file having an identifier value different from 0x3F00 is allocated to each profile embedded in the secure element.

The identifiers of the root files are unique for each profile. These root files can have an identifier equal to any value different from 0x3F00. Each root file has its own identifier value which can be unambiguously determined. Preferably, identifier values of the root files are set so that there is no collision even if the Short File Identifier (SFI) mechanism is used.

Figure 1:
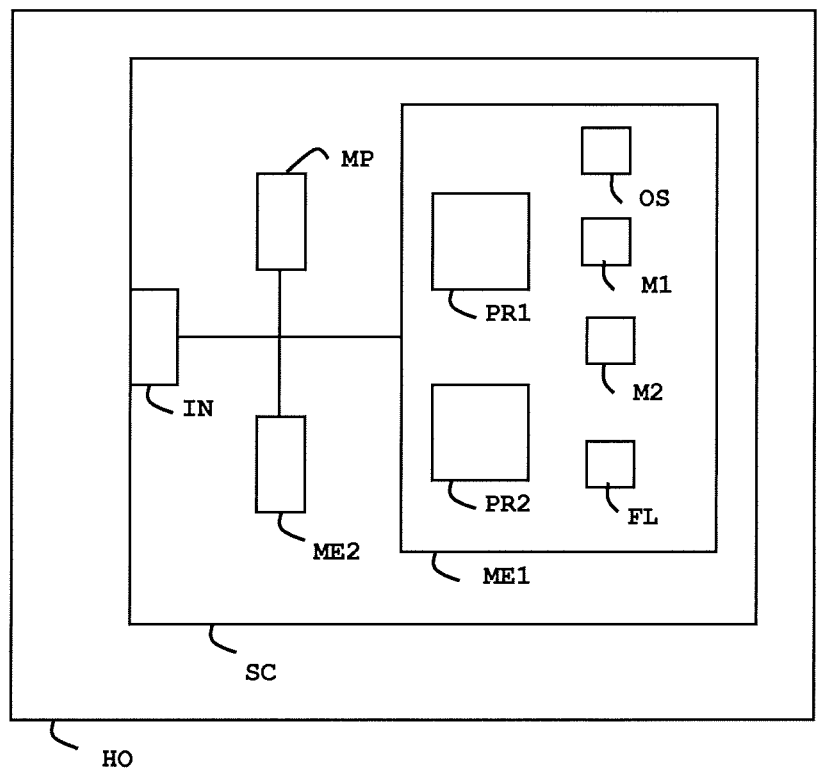
FIG. 1 is an example of a host device including a secure element according to the invention.

FIG. 1 shows a host device HO comprising a secure element SC according to the invention.

In this example, the host device HO is a mobile phone having a hardware communication interface for communicating with the secure element.

The secure element SC is an UICC which comprises a communication interface IN, a processing module MP, a volatile memory ME2 and a non-volatile memory ME1. The non-volatile memory ME1 comprises an operating system OS and the profiles PR1 and PR2.

The non-volatile memory ME1 comprises a guiding module M2 configured to enable browsing of the logical tree structure which comprises the root file explicitly targeted by a received Select file command. More precisely, in response to the receipt of a Select file command aiming at selecting a specific root file, the guiding module M2 is configured to select the specific root file.

The non-volatile memory ME1 comprises flag FL storing a value reflecting the currently active profile. The non-volatile memory ME1 comprises a selecting module M1 configured to select the root file of the currently active profile in response to the receipt of a Select file command aiming at selecting a file having an identifier equal to 0x3F00. It should be noted that the secure element SC does not comprise any root file with the identifier value 0x3F00.

In another embodiment, the operating system OS may be configured to manage an indicator pointing on the root file of the currently active profile and may be designed to select this root file in response to the receipt of a Select file command aiming at selecting a file having an identifier equal to 0x3F00. In such a case, the flag FL and selecting module M1 are no longer needed.

Figure 2:
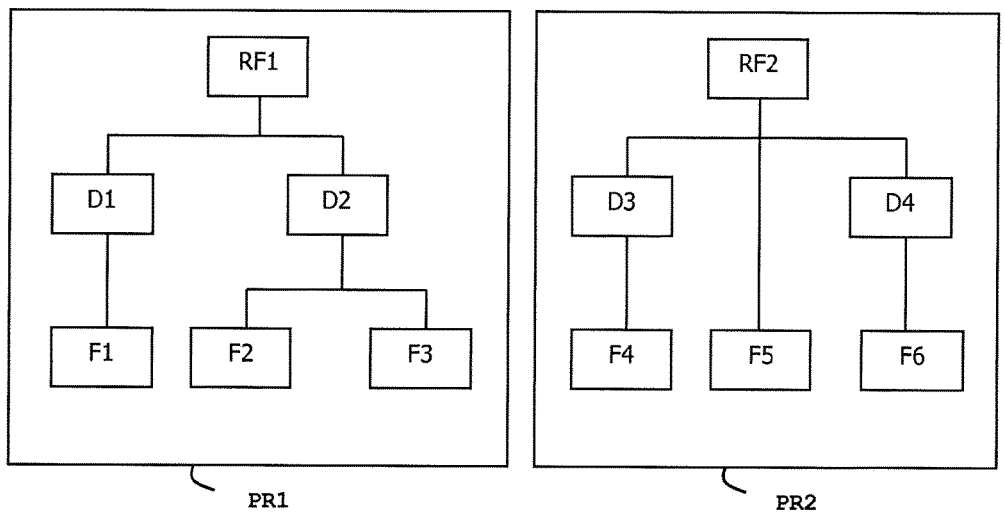
FIG. 2 shows an example of file type for logical tree structures in a secure element according to the invention.

FIG. 2 shows an example of two logical tree structures correspondent to two profiles PR1 and PR2 in a secure element SC according to the invention.

The first profile PR1 comprises a logical tree structure including a root file RF1 which comprises two directories D1 and D2. The directory D1 comprises a file F1 and the directory D2 comprises two files F2 and F3.

The second profile PR2 comprises a logical tree structure including a root file RF2 which comprises two directories D3 and D4. The directory D3 comprises a file F4 and the directory D4 comprises a file F6. The root file RF2 is considered as a directory and comprises a file F5.

Figure 3:
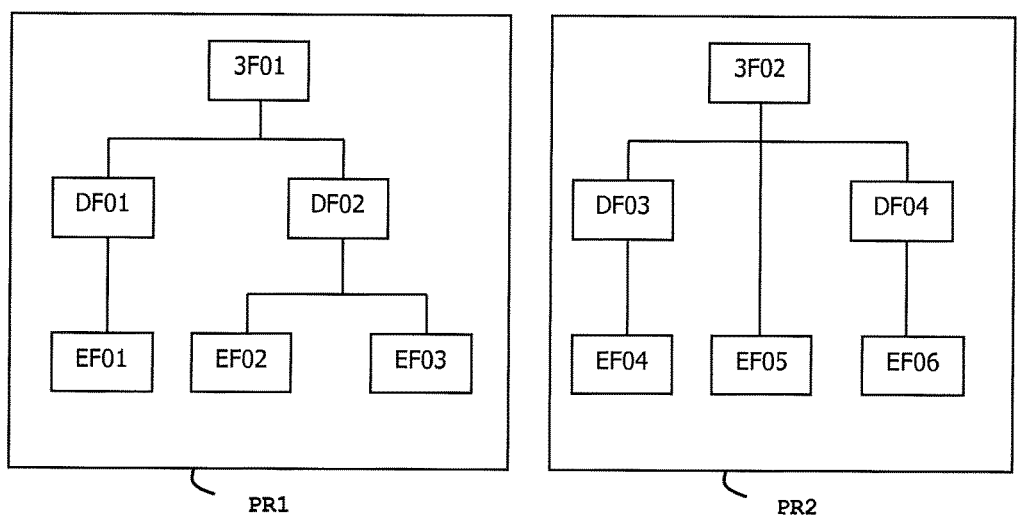
FIG. 3 shows an example of file identifier for logical tree structures embedded in a secure element according to the invention.

FIG. 3 shows an example of identifiers used for the two logical tree structures of FIG. 2.

The root file RF1 has an identifier equal to 0x3F01. The directory D1 has an identifier equal to 0xDF01. The directory D2 has an identifier equal to 0xDF02. The file F1 has an identifier equal to 0xEF01. The file F2 has an identifier equal to 0xEF02. The file F3 has an identifier equal to 0xEF03.

The root file RF2 has an identifier equal to 0x3F02. The directory D3 has an identifier equal to 0xDF03. The directory D4 has an identifier equal to 0xDF04. The file F4 has an identifier equal to 0xEF04. The file F5 has an identifier equal to 0xEF05. The file F6 has an identifier equal to 0xEF06.

An example of a method according to the invention is now described starting from the profiles described at FIG. 3. The profile PR1 is assumed to have been previously activated. By default, the logical tree structure of the profile PR1 is the current one.

When the host device needs to access the logical tree structure of the profile PR2, it can send a select file command targeting the identifier 0x3F02.

Upon receipt of this select file command, the secure element enables the browsing of the tree structure of the profile PR2 and selects the root file RF2. Thus the root file RF2 is now the current file into the secure element while the profile PR1 remains the currently activated profile.

At a further step, when the host device needs to access the logical tree structure of the profile PR1, it can send a select file command targeting the identifier 0x3F00 or 0x3F01.

According to the invention, the identifier with the value 0x3F01 is interpreted by the secure element as a select of the root file of the profile PR1. Upon receipt of the select file command, the secure element enables the browsing of the tree structure of the profile PR1 and selects the root file RF1. Thus the root file RF1 is now the current file into the secure element.

According to an embodiment of the invention, the identifier with the value 0x3F00 is interpreted by the secure element as the root file belonging to the logical tree structure of the currently active profile. Since the active profile is still the profile PR1, the root file 0x3F01 is selected and its logical tree structure becomes reachable through the usual browsing mechanism. Thus the root file RF1 is now the current file into the secure element.

Advantageously, when the response message corresponding to the select file command is intended to send back the identifier of the selected file, the secure element sends a response message comprising the identifier value 0x3F00 even if the actually selected file has the identifier value 0x3F01.

Thanks to the invention the device which sends the select file command can easily access files of any targeted profiles.

Thanks to the invention, the secure element is compliant with host devices which select the root file of the current profile in a customary way. (i.e. "select 0x3F00")

An advantage of the invention is to allow access to the logical tree structure of a profile different from the active profile without changing the currently active profile.

It must be understood, within the scope of the invention, that the above-described embodiments are provided as non-limitative examples. In particular, the secure element may comprise any number of profiles and these profiles may be related to different kind of subscription and different domains, like payment, telecom, transport access, Identity, metering, video access or cloud services access for instance.

It should be noted that select file commands may be sent by a remote machine distinct from the host device hosting the secure element.

The architecture of the host device and the architecture of the secure element shown at FIG. 1 are provided as examples only. These architectures may be different. For example, the selecting module M1 and the guiding module M2 may be merged as a unique module.

The invention applies to any kind of secure element able to receive a select file command. In particular, the invention applies to secure elements of UICC type and embedded-UICC type.

The invention claimed is:

1. A secure element including a chip and first and second profiles comprising files organized in respective first and second logical tree structures,
    wherein said first logical tree structure includes a first root file and said second logical tree structure includes a second root file, wherein said root files have identifiers whose values are different from 0x3F00 and wherein said secure element is configured to enable browsing of the logical tree structure comprising a targeted root file in response to the receipt of a Select file command aiming at selecting said targeted root file, and
    said secure element is configured to select the root file of the profile currently activated in response to the receipt of a Select file command aiming at selecting a file having an identifier whose value is equal to 0x3F00.

2. A secure element according to claim 1, wherein said secure element includes a nonvolatile memory which contains a flag containing the identifier of the root file of the profile currently activated and wherein said secure element includes a selecting module adapted to select the root file of the profile currently activated by using the flag when receiving a Select file command aiming at selecting a file having an identifier whose value is equal to 0x3F00.

3. A secure element according to claim 1, wherein said secure element includes an operating system configured to manage an indicator pointing on the root file of the currently active profile and to select the root file of the currently active profile in response to the receipt of a Select file command aiming at selecting a file having an identifier equal to 0x3F00.

4. A secure element according to claim 1, wherein said secure element is configured to send a response message comprising an identifier whose value is equal to 0x3F00 in response to said select file command.

5. A secure element according to claim 1, wherein said first profile being activated, said secure element is configured to select the second root file in response to the receipt of a Select file command aiming at selecting a file having an identifier whose value is equal to the value of the identifier of the second root file, and to keep said first profile activated.

6. A method for managing profiles in a secure element, said secure element including first and second profiles comprising files organized in respective first and second logical tree structures comprising respective root files,
    wherein first logical tree structure includes a first root file and said second logical tree structure includes a second root file,
    wherein said root files have identifiers whose values are different from 0x3F00 and wherein said method comprises the step of enabling browsing of the logical tree structure comprising a targeted root file in response to the receipt of a Select file command aiming at selecting said targeted root file, and
    said method further comprises the step of selecting the root file of the profile currently activated in response to the receipt of a Select file command aiming at selecting a file having an identifier whose value is equal to 0x3F00.

7. A method according to claim 6, wherein said secure element sends a response message comprising an identifier whose value is equal to 0x3F00 in response to said select file command.

8. A method according to claim 6, wherein said first profile being activated, said secure element selects the second root file in response to the receipt of a Select file command aiming at selecting a file having an identifier whose value is equal to the value of the identifier of the second root file and keeps said first profile activated.

9. A host device comprising a secure element wherein
    the secure element is a Universal Integrated Circuit Card or an embedded Universal Integrated Circuit Card,
    the secure element includes a chip and first and second profiles comprising files organized in respective first and second logical tree structures,
    said first logical tree structure includes a first root file and said second logical tree structure includes a second root file, wherein said root files have identifiers whose values are different from 0x3F00 and wherein said secure element is configured to enable browsing of the logical tree structure comprising a targeted root file in response to the receipt of a Select file command aiming at selecting said targeted root file, and
    said secure element is configured to select the root file of the profile currently activated in response to the receipt of a Select file command aiming at selecting a file having an identifier whose value is equal to 0x3F00.

* * * * *